US007468972B2

(12) United States Patent
Walsh et al.

(10) Patent No.: US 7,468,972 B2
(45) Date of Patent: Dec. 23, 2008

(54) METHOD AND SYSTEM FOR PROVIDING EFFICIENT DATA TRANSMISSION BASED UPON A CONTENTION PROTOCOL

(75) Inventors: William Walsh, Anaheim Hills, CA (US); Craig Schweinhart, Rockville, MD (US); Abheek Saha, New Delhi (IN); Mark Abinante, Inglewood, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 675 days.

(21) Appl. No.: 09/789,969

(22) Filed: Feb. 22, 2001

(65) Prior Publication Data

US 2002/0114313 A1 Aug. 22, 2002

Related U.S. Application Data

(60) Provisional application No. 60/220,874, filed on Jul. 26, 2000.

(51) Int. Cl.
H04B 7/212 (2006.01)

(52) U.S. Cl. .............. 370/348; 370/347; 370/337; 370/329; 370/341; 370/432

(58) Field of Classification Search ........ 370/347, 370/348, 337, 329, 328, 341, 431, 442, 342
See application file for complete search history.

(56) References Cited

U.S. PATENT DOCUMENTS

| 4,536,838 | A | * | 8/1985 | Ringel et al. ............ 710/109 |
| 4,736,371 | A | * | 4/1988 | Tejima et al. ............ 370/236 |
| 4,742,512 | A | * | 5/1988 | Akashi et al. ............ 370/347 |
| 5,003,534 | A | * | 3/1991 | Gerhardt et al. ........... 370/322 |
| 5,012,469 | A |   | 4/1991 | Sardana |
| 5,172,375 | A | * | 12/1992 | Kou .................... 370/322 |
| 5,278,833 | A | * | 1/1994 | Crisler et al. ............ 370/348 |
| 5,299,199 | A | * | 3/1994 | Wilson et al. ........... 370/347 |
| 5,594,738 | A | * | 1/1997 | Crisler et al. ............ 370/347 |
| 5,598,417 | A | * | 1/1997 | Crisler et al. ............ 370/348 |

(Continued)

FOREIGN PATENT DOCUMENTS

GB        2278978 A  * 12/1994

(Continued)

OTHER PUBLICATIONS

Crowther, W., Rettberg, R., Walden, D., Ornstein, S., and Heart, F., "A System for Broadcast Communications: Reservation ALOHA," Proc. Sixth Hawaii Int. Conf. Syst. Sci., Jan. 1973, pp. 371-374.

(Continued)

*Primary Examiner*—Edan Orgad
*Assistant Examiner*—Andrew C Lee
(74) *Attorney, Agent, or Firm*—Bell, Boyd & Lloyd LLP

(57) ABSTRACT

An approach for transmitting packets over a shared communication channel is disclosed. A satellite terminal (ST) (103, 105, 107, 109) contains a processor that transmits a packet over a transmission slot of the channel using a contention protocol, such as persistent Aloha. The processor reserves an available transmission slot, which is maintained until expiration of a predetermined timeout period.

30 Claims, 5 Drawing Sheets

U.S. PATENT DOCUMENTS

| | | | |
|---|---|---|---|
| 5,625,628 A | 4/1997 | Heath | |
| 5,790,535 A * | 8/1998 | Kou | 370/337 |
| 5,812,545 A * | 9/1998 | Liebowitz et al. | 370/337 |
| 5,953,323 A * | 9/1999 | Haartsen | 370/330 |
| 5,960,001 A * | 9/1999 | Shaffer et al. | 370/448 |
| 6,038,593 A * | 3/2000 | Huckins | 709/217 |
| 6,240,073 B1 * | 5/2001 | Reichman et al. | 370/319 |
| RE37,301 E * | 7/2001 | Lo | 370/448 |
| 6,477,368 B1 * | 11/2002 | Korneluk et al. | 455/423 |
| 6,490,645 B1 * | 12/2002 | Shahaf et al. | 710/244 |
| 6,522,635 B1 * | 2/2003 | Bedwell | 370/314 |
| 6,584,097 B1 * | 6/2003 | Malik | 370/352 |
| 6,594,233 B1 * | 7/2003 | Hicks | 370/235 |
| 6,594,240 B1 * | 7/2003 | Chuah et al. | 370/328 |
| 6,658,463 B1 * | 12/2003 | Dillon et al. | 709/219 |
| 6,690,661 B1 * | 2/2004 | Agarwal et al. | 370/337 |
| 6,697,346 B1 * | 2/2004 | Halton et al. | 370/335 |
| 7,161,921 B2 * | 1/2007 | LoGalbo et al. | 370/337 |
| 2003/0103521 A1 * | 6/2003 | Raphaeli et al. | 370/445 |

FOREIGN PATENT DOCUMENTS

WO      WO 01/80454      10/2001

OTHER PUBLICATIONS

Kleinrock, L , Fellow, IEEE, And Fouad A. Tobagi, "Packet Switching in Radio Channels: Part I-Carrier Sense Multiple-Access Modes and Their Throughput-Delay Characteristics", IEEE Transactions On Communications, Vol. COM-23, No. 12, Dec. 1975.

* cited by examiner

METHOD AND SYSTEM FOR PROVIDING EFFICIENT DATA TRANSMISSION BASED UPON A CONTENTION PROTOCOL

CROSS-REFERENCES TO RELATED APPLICATION

This application is related to, and claims the benefit of the earlier filing date of, U.S. Provisional Patent Application Ser. No. 60/220,874, filed Jul. 26, 2000, titled "Method and System for Providing Efficient Data Transmission Based Upon a Contention Protocol," the entirety of which is incorporated herein by reference.

BACKGROUND OF THE INVENTION

1. Field of the Invention

The present invention relates generally to a broadband communication system, and is more particularly related to data transmission from a terminal using a contention protocol.

2. Discussion of the Background

Satellite communications systems have emerged as an accessible and reliable network infrastructure that can support the exchange of voice, video, and data traffic. Conventionally, these satellite communications systems offer dedicated communication channels that relay or tunnel traffic without processing such traffic (i.e., "bent pipe"). That is, the system has no knowledge of what types of protocols are used or data that is contained within the packets. One drawback with these satellite communications systems is that they are highly inefficient with respect to bandwidth allocation. For example, if the satellite has excess transponder bandwidth at a particular time, this excess capacity cannot be temporality reallocated to another satellite terminal (ST). Another drawback is that the satellite cannot perform any processing on the received traffic; thus, key networking functions, such as flow control and congestion control, are not available. Yet another drawback concerns the inflexibility of the system to adapt dynamically to the traffic requirements of the STs.

The maturity of electronic commerce and acceptance of the Internet as a daily tool by millions of users (this user base continues to grow) only intensify the need to develop techniques to streamline capacity usage. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure. Therefore, efficient use of network capacity is imperative, particularly in systems where capacity needs to be managed carefully, such as a satellite network.

Given the bursty nature of Internet traffic, traffic emanating from the STs can vary greatly, thereby making it technically impractical to adjust the static channel assignments of the traditional bent pipe satellite systems.

To support Internet traffic, the satellite communications system must transport TCP (Transmission Control Protocol) traffic. Moreover, the satellite communications system should support networks with a large number of remotes (e.g., homes) that connect to a few central sites (e.g., Internet Service Providers (ISPs) Point of Presence (POP)). In this configuration, the remotes initiate downloads from the central sites. Typically, there exist a large number of remotes, and the probability of any given remote accessing the system at any given time is very low. Thus, these accesses are via contention rather than reserved slots. However, conventionally, once an access is made, a train of small messages are returned from the remote; these messages may include, among other information, TCP synchronization information, TCP acknowledgement information that are required to provide reliable delivery of data, and HTTP (Hyper Text Transfer Protocol) GET messages.

The nature of Internet traffic is such that file sizes are heavily distributed towards the small end; possibly 80% of the downloads over the Internet are less than 10KB. However, the distribution of file sizes also exhibits a heavy tail. As a result, half the download capacity of the system might be used to transfer files greater than 1 MB.

To transport these large files, TCP utilizes segmentation to transfer the file. The receiving TCP node typically sends acknowledgement messages ("acks") for every second TCP segment that is received. In the case in which Ethernet, for example, is used in a terrestrial subnetwork, TCP segments may be no larger than 1460 bytes. In actuality, the average size may be closer to 1 KB, because some variants of TCP will not use "path MTU (maximum transfer unit) discovery", resulting in 536 byte segments.

A satellite communications system, thus, must take into account the behavior of TCP traffic to optimize use of communication resources. To address this issue, use of contention channels have been suggested. To allow for reasonable latencies for communication using contention channels (i.e., keeping the collision probability low), typically a large number of contention slots might be provisioned for every one slot that is actually used. In a system where the acknowledgments are sent over contention channels, for every 2 KB of TCP data, 2 KB of effective uplink capacity has to be put aside to return the acknowledgements. The impact of this is that twice the amount of uplink capacity has to be provided at the satellite than what is actually used. Accordingly, conventional systems that employ contention channels use bandwidth resources inefficiently.

Based on the foregoing, there is a clear need for improved approaches for transmitting data over contention channels in a satellite communications system.

There is also a need to enhance efficient utilization of the system capacity.

There is also a need to reduce network latency.

There is a further need to reduce user response time.

Based on the need to improve system efficiency, an approach for utilizing contention channels that account for the behavior of the data traffic is highly desirable.

SUMMARY OF THE INVENTION

According to one aspect of the invention, a method is provided for transmitting packets over a shared communication channel that is partitioned into a plurality of transmission slots. The method includes transmitting one of the packets over one of the plurality of transmission slots of the channel using a contention protocol. The method also includes reserving an available transmission slot from the plurality of transmission slots, and maintaining the reserved transmission slot until expiration of a predetermined timeout period. Under this approach, the user response time is reduced, while providing efficient use of system capacity.

According to another aspect of the invention, a terminal apparatus for transmitting packets over a shared communication channel that is partitioned into a plurality of transmission slots comprises a plurality of queues that are configured to store the packets. A processor is configured to transmit one of the packets over one of the plurality of transmission slots of the channel using a contention protocol. The processor reserves an available transmission slot from the plurality of transmission slots, wherein the reserved transmission slot is maintained until expiration of a predetermined timeout period. This arrangement advantageously improves system throughput.

According to another aspect of the invention, a satellite communications system comprises a payload that is configured to forward packets. A plurality of terminals are configured to transmit the packets over a shared communication channel that is partitioned into a plurality of transmission slots. Each of the terminals comprises a plurality of queues that are configured to store the packets, and a processor that is configured to transmit one of the packets over one of the plurality of transmission slots of the channel using a contention protocol. The processor reserves an available transmission slot from the plurality of transmission slots, wherein the reserved transmission slot is maintained until expiration of a predetermined timeout period. The above arrangement advantageously enhances system performance by optimizing transport of data traffic.

According to another aspect of the invention, a terminal apparatus for transmitting packets over a shared communication channel that is partitioned into a plurality of transmission slots comprises means for transmitting one of the packets over one of the plurality of transmission slots of the channel using a contention protocol. The terminal apparatus also includes means for reserving an available transmission slot from the plurality of transmission slots, and means for maintaining the reserved transmission slot until expiration of a predetermined timeout period. The above arrangement advantageously provides efficient use of contention channels.

In yet another aspect of the invention, a computer-readable medium carrying one or more sequences of one or more instructions for transmitting packets over a shared communication channel that is partitioned into a plurality of transmission slots is disclosed, The one or more sequences of one or more instructions include instructions which, when executed by one or more processors, cause the one or more processors to perform the step of transmitting one of the packets over one of the plurality of transmission slots of the channel using a contention protocol. Another step includes reserving an available transmission slot from the plurality of transmission slots. Yet another step includes maintaining the reserved transmission slot until expiration of a predetermined timeout period. This approach advantageously improves servicing of user traffic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes efficient use of contention channels in a satellite communications system. The system employs spatial division multiplexing; the contention channels are partitioned by uplink region (i.e., uplink cell). The STs obtain information on contention slot usage from the satellite every transmission frame. An information message from the satellite notifies the STs of which slots contain valid transmissions. The ST transmits a packet over a transmission slot of the channel using a contention protocol, such as slotted Aloha, but in a manner that avoids contention slots that were successfully used a frame period ago. After successful transmission, the ST can thus reserve the same slot in the subsequent frame for its exclusive use.

Although the present invention is described with respect to a satellite communications system that supports exchange of Transmission Control Protocol (TCP) traffic, it is recognized by one of ordinary skill in the art that the present invention has general applicability to packet switched communication systems utilizing other equivalent protocols.

Figure 1:
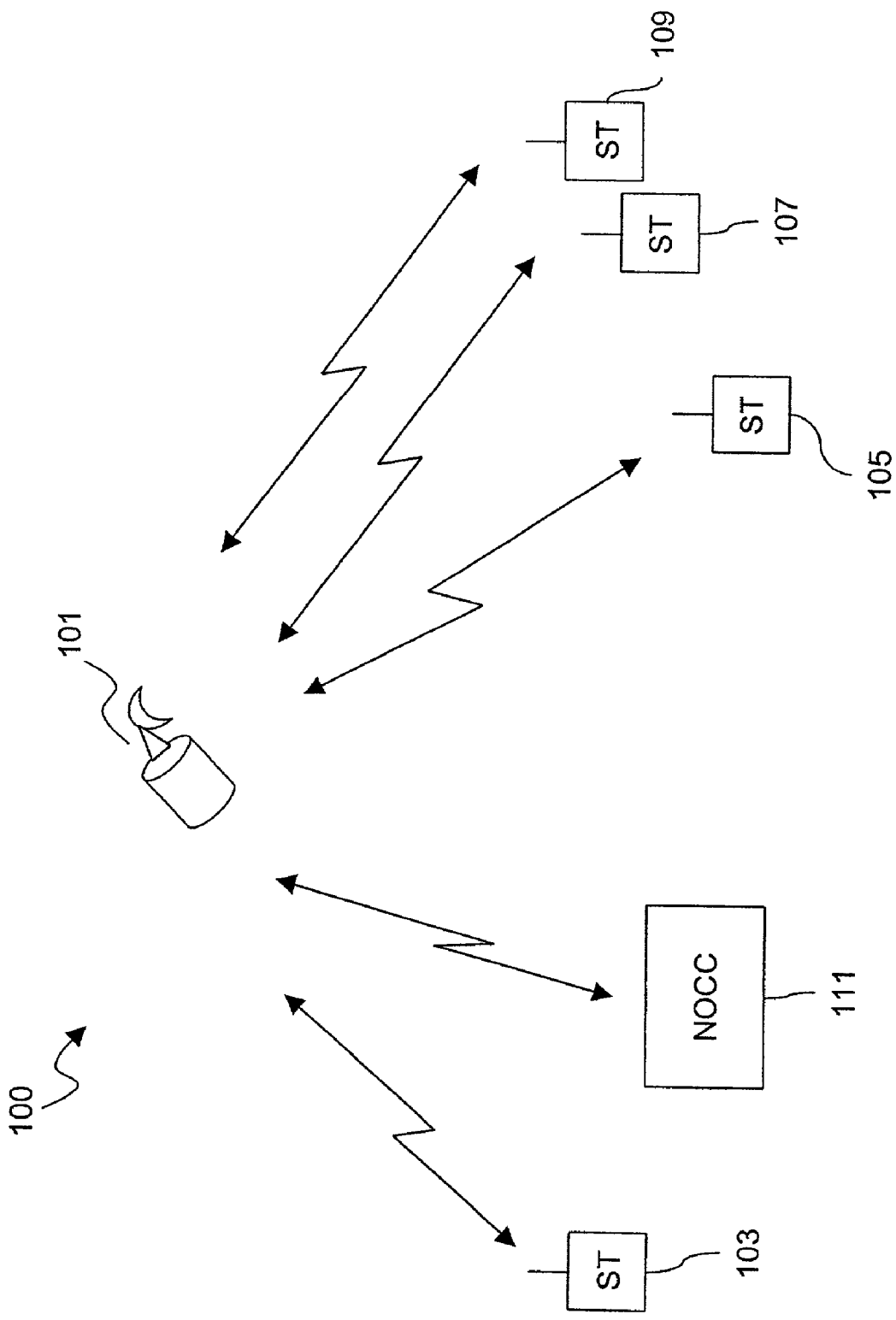
FIG. 1 is a block diagram of a satellite communications system capable of supporting contention channels, in accordance with an embodiment of the present invention.

FIG. 1 show a block diagram of a satellite communications system capable of supporting contention channels, in accordance with an embodiment of the present invention. A communication system 100 includes a satellite 101 that supports communication among satellite terminals (STs) 103, 105, 107, and 109. System 100 employs Network Operations Control Center (NOCC) 111 to manage and control communication services and operations. For example, the NOCC 111 provisions and identifies the channels that are to be used for a persistent-Aloha channel. The satellite 101 provides data transmission over contention channels using, according to one embodiment of the present invention, the persistent Aloha protocol.

In an exemplary embodiment, the STs 103, 105, 107, and 109 are Very Small Aperture (VSAT) terminals. Under this architecture, users can communicate from one VSAT ST to another directly with one satellite hop. That is, the system 100 provides mesh connectivity. According to one embodiment of the present invention, system 100 possess a centralized reservation mechanism for providing bandwidth on demand (BoD). Because BoD request rate may be limited, the present invention act to offload the centralized reservation mechanism by handling low data rate flows.

Figure 2:
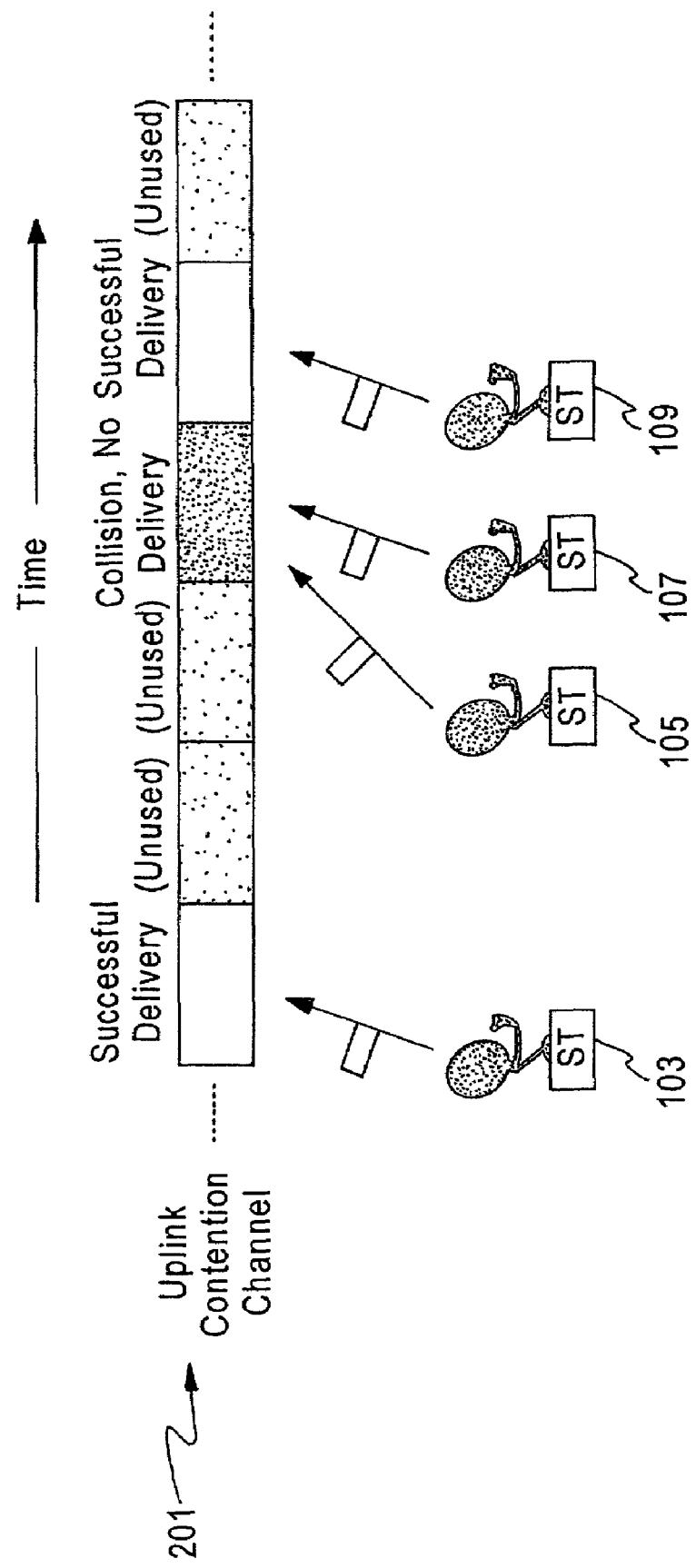
FIG. 2 is a diagram of Satellite Terminals (STs) transmitting packets to a shared communication channel using the persistent Aloha (PA) protocol, according to an embodiment of the present invention.

FIG. 2 show a diagram of Satellite Terminals (STs) transmitting packets to a shared communication channel using the persistent Aloha protocol, according to an embodiment of the present invention. Dynamic and dedicated contention channels are divided into three classes: data only, control only, and data/control. Control contention channels are those that can only be used to send bandwidth requests or signaling information to the satellite 101 or the NOCC 111. Data contention channels are those that can only be used for data ALOHA traffic. Contention channels that are marked data and contention can be used to send both kinds of packets.

A ST 103, 105, 107, and 109 may send a packet burst into a timeslot on a reserved channel only if it has sent a request packet to the satellite 101 requesting reserved slots, and the satellite 101 has sent an allocation to the ST authorizing it to use specific timeslots on a specific channel.

When a ST 103, 105, 107, and 109 starts to use a persistent-Aloha (PA) channel, the ST 103, 105, 107, and 109 simply sends a packet data burst into a random unused timeslot on the channel. If no other ST 103, 105, 107, and 109 sends a burst to the same channel and timeslot, the satellite 101 will be able to process and deliver the packets in the burst. If two or more STs (e.g., 105 and 107) send a burst to the same channel and timeslot, a collision occurs. As a result, it is likely that none of the destinations will receive the burst. However, in some cases when there is a collision, one burst will be processed and delivered while the other is lost. STs 103, 105, 107, and 109 do not get direct confirmation that a satellite 101 has processed a contention channel burst or it has been lost. Instead, STs 103, 105, 107, and 109 have to determine that data sent to a contention channel 201 has been processed by waiting for a response from the satellite 101, ST or end user to which packets were addressed.

If the ST 103, 105, 107, and 109 has received a satellite 101 multicast indicating dynamic contention channels for the next frame, the ST 103, 105, 107, and 109 randomizes the bandwidth request over the total slots in the dedicated and dynamic contention channels that are marked control or data/control.

In addition to BoD reservations, the system 100 offers contention access. Contention access allows STs 103, 105, 107, and 109 that are authorized for the service to send packets to slots in uplink data contention channels without either specific authorization for each use from the NOCC 111 or an uplink allocation from the BoD mechanism. STs 103, 105, 107, and 109 randomly pick channels and slots to use for contention access to minimize the probability of collisions from other STs that are also authorized for contention access. Contention channels must be managed and configured so that they are no more than about 10% occupied, on the average. If average occupancy significantly exceeds 10%, contention channels can become unstable and experience low throughput because of collisions. If the average occupancy of a contention channel is about 10%, then the collision rate is also about 10%, so the Packet Loss Rate is about 10%.

However, there are traffic patterns, notably TCP acks and web browsing, which are ill-suited to either approach. Large amount of low data rate flows, such as TCP acks pose either a capacity problem for contention, or a request volume problem for BoD. In addition, the media access delays associated with BoD pose a latency problem for protocols in which a large number of messages are exchanged, such as web browsing. As a result, persistent-Aloha is provided as an independent access method. Although PA channels are contention channels, they describe an intermittent period of activity. If enough PA channels are provided so that the 10% collision rule is observed, and on average four reservation slots are used, PA channel utilization would be closer to 40% than the 10% expected utilization of a conventional contention channel.

Figure 3:
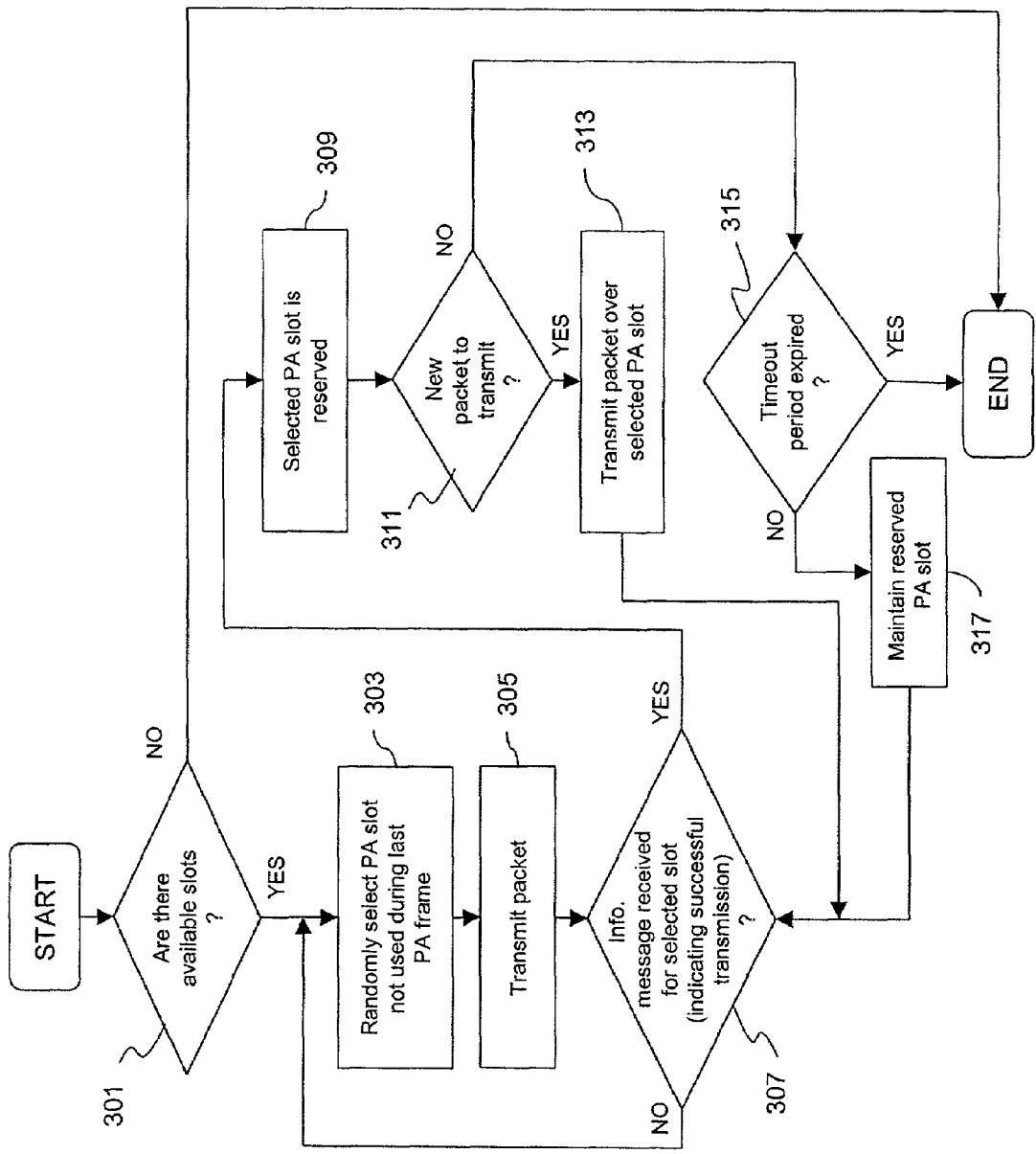
FIG. 3 is a flowchart of the operation of the persistent Aloha protocol, according to an embodiment of the present invention.

FIG. 3 show a flowchart of the operation of the persistent Aloha (PA) protocol, according to an embodiment of the present invention. PA is a technology for forwarding data over satellite links that can be used to solve the problem with efficiently forwarding TCP acks, for example. The NOCC 111 provides information to the STs in MIPs (Management Information Packet) indicating persistent Aloha channels in the uplink cell and their frame periods. The system 100 may support PA frame periods of one or six frames. MIPs are sent periodically (e.g., every 10 minutes), in which any change is only effective upon the second transmission. A ST ceases using PA if it has missed two PA MIPs in sequence. In the example of FIG. 3, it is assumed that the success of an initial transmission is known before the reserved slot appears, as in the case of a PA frame period of six frames.

In step 301, ST (e.g., 103, 105,107, and 109) determines whether there are available transmission slots. If an available slot exists, then ST 103, 105, 107, and 109 randomly selects a PA slot that was not used during the last PA frame, per step 303. In selecting an initial Persistent Aloha slot, the ST 103, 105, 107, and 109, at the beginning of a frame, picks with equal probability from among all unused PA slots that are occurring on the configured PA channels, and are within the next frame. In the 1 slot per 6 frame PA scenario, it is the last PA frame; in the 1 slot per frame PA case, it is the PA frame that was six back. Next, the packet is transmitted (step 305).

An information message is received by all STs 103, 105, 107, and 109 on a frame-by-frame basis indicating which slots contain valid transmissions. The ST 103, 105, 107, and 109 stores the last second of the uplink information message for each slot of at least one persistent Aloha channel(s) that the STs 103, 105, 107, and 109 is configured to use. The ST 103, 105, 107, and 109 determines, as in step 307, whether the received information message indicates a successful transmission of the packet.

Next, in step 309, the selected PA slot is considered reserved for the ST 103, 105, 107, and 109. The ST 103, 105, 107, and 109 checks whether there is a new packet to transmit, per step 311. In step 313, the ST 103, 105, 107, and 109 transmits the packet over the selected PA slot. That is, when one successful initial transmission is made, a follow on slot is reserved. If that follow on slot is used, another slot is reserved.

A timeout mechanism is available in the ST 103, 105, 107, and 109 to regulate this process. In step 315, the ST 103, 105, 107, and 109 checks whether the timeout period has expired; if the timeout period has not been exceeded, the reserved slot is maintained through the use of null packets, which are sent in the reserved slots (to keep the reservation open) until a timeout occurs (step 317). Thereafter, step 307 is repeated.

For a period, not exceeding the configurable timeout duration, if the ST 103, 105, 107, and 109 does not have any data to send on a PA allocation, the ST 103, 105, 107, and 109 can transmit null packets to keep the PA channel open. If the ST 103, 105, 107, and 109 fails to transmit either data or a null code block in a PA slot that has acquired, the ST 103, 105, 107, and 109 cannot use the PA slot unless the ST 103, 105, 107, and 109 re-acquires it.

This timeout can be used to optimize efficiency when the arriving traffic is more bursty than a one-slot timeout supports. If the spacing of these slots is right, it will cause the system 100 to pack the acknowledgments, in the case of TCP data traffic, into predetermined slots (i.e., according to slots as defined by the satellite communications system 100). The spacing, which is configurable, also gives enough data rate to return acknowledgments at the desired download rate.

The result of reserving the follow on is that we have to provision an additional slot for every successful contention transmission. For single slot hold times, this costs 10% in capacity, but as the hold time increases, significant capacity savings result. The benefit is that arbitrarily sized objects can be moved over the contention channel, albeit only at (multiples of) pre-configured data rates.

The PA algorithm provides a two fold process by which schedules for queues are put together on a frame basis, and the packets for such queues are scheduled on a slot basis. This PA algorithm, which is in pseudo-code form, can be described as follows, assuming the ST evaluates bandwidth needs each frame when idle, and once every six frames when not idle:

If the outcome of the BoD volume request assessment process is a single BoD volume request for the PA queue for a number of volume slots less than the configured threshold then If the PA channel is already setup then Done else (1) Pick a PA slot in the upcoming frame that was not used during the last PA frame for which all Satellite 101 control information should be available.

a) For 1 slot per 6 frames PA this is the last PA frame b) For 1 slot per frame PA this is six PA frames ago Pick this slot in a manner so that all available slots have roughly the same probably to get picked (2) Avoid any slots for which appropriate Satellite 101 control iformation is not available.

The following process occurs when making a schedule for transmission opportunities next frame:

If a PA assignment exists that is active this frame then

If BoD grants are occurring this frame then cancel the PA assignment else

1. Schedule the PA transmission opportunity

2. Schedule the tuning to and from the PA contention channel

3. Exclude the PA slot and retuning outages from the LVLL (Low Volume, Low Latency) contention transmission opportunities The following process occurs when filling a PA assignment:

If the LVLL queue is non-empty then draw from the LVLL queue and clear timer

Else if the PA queue is non-empty then draw from the PA queue and clear timer

Else advance timer

If timeout then cancel PA reservation by not transmitting

Else transmit the selected packet, or if no packet was selected, transmit a null packet The following occurs when receiving an information message:

1. Log the successful transmission for each slot of the PA channel(s) for which the ST is allowed to make PA requests. Only one second of records need to be kept, so not much storage is required.
2. If an initial PA transmission occurred during the period recorded in the information message, check to see if no successful transmission was recorded. If so, cancel the PA assignment.
3. If an initial PA transmission occurred in a PA slot for which this information message has a successful transmission recorded, the transmission occurred before receipt of the information message, the information message showing a successful transmission on this initial transmission has not yet been received, cancel the PA assignment.
4. If the information message covering an initial PA transmission has been lost, cancel the PA assignment.
5. For 1 slot per frame PA, if an information message describing the usage of the PA slot for the six frames prior to transmission of the initial PA request gets lost, cancel the PA assignment.

The following occurs when receiving a MIP regarding PA:

If no MIPs are received for the last 20 minutes, cancel the ability for the ST to use PA If a MIP is received, and no PA information is available, store it and enable the ST to use PA.

Else if PA information is available then,

If no changes is indicated—done

If a change is indicated schedule it at the indicated time (two handover messages are sent)

The above pseudo-code represents one embodiment of the present invention; it is recognized that other variations are possible.

Figure 4:
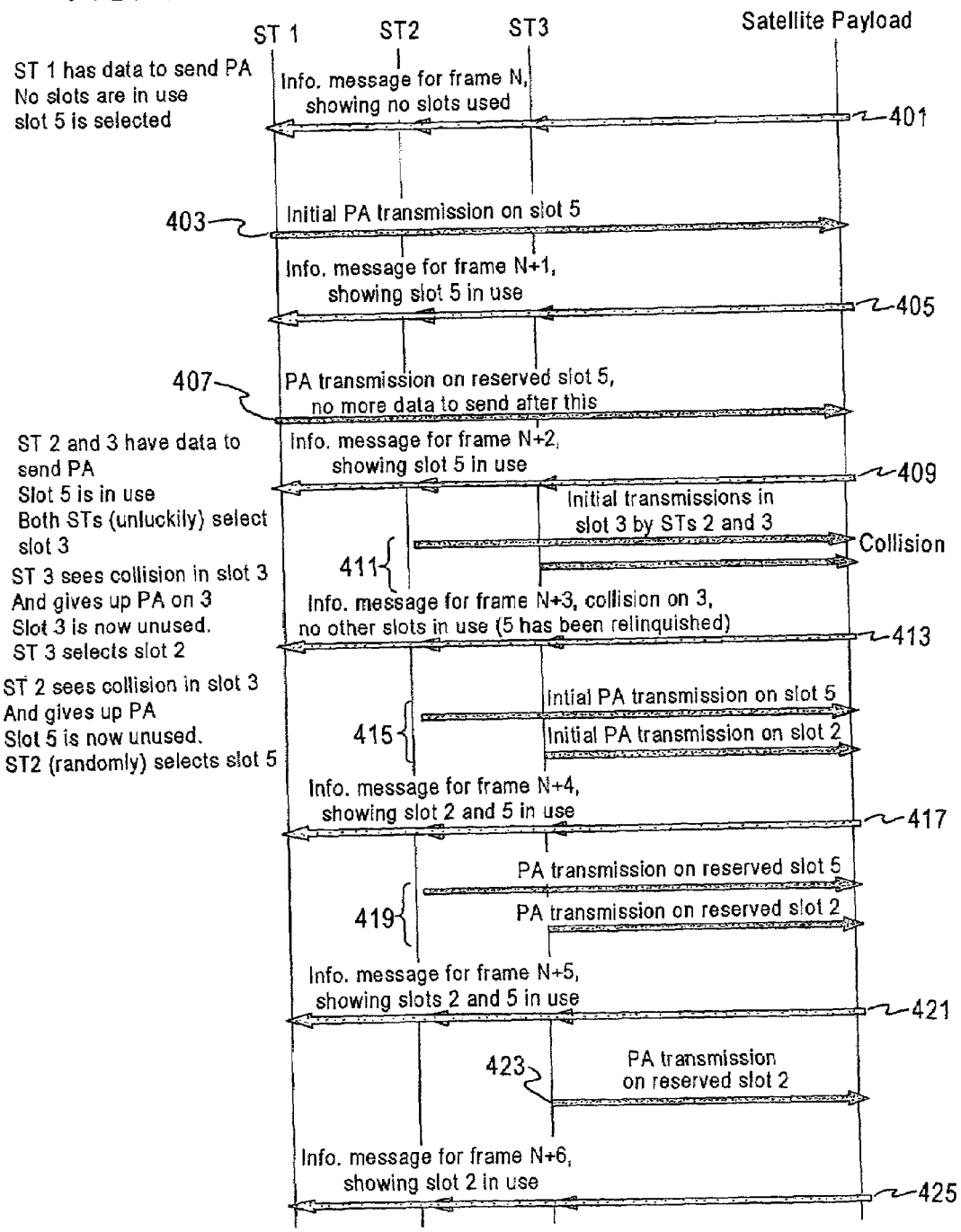
FIG. 4 is a sequence diagram showing the message exchanges between STs and a satellite using persistent Aloha channels, according to an embodiment of the present invention.

FIG. 4 is a sequence diagram showing the message exchanges between STs and a satellite using persistent Aloha channels, according to an embodiment of the present invention. This figure shows an exemplary event trace for three satellite terminals, using persistent Aloha resources. For the purposes of explanation, the event trace is simplified in the following manner. Information messages are sent periodically (e.g., every 96 ms); however, in actual implementation the space delay (up and down) may be such as much as 400 ms.

In step 401, the satellite 101, for example, returns uplink control (Satellite 101 control) messages on each slot every frame; starting with frame N, in this example.

In step 411, STs 2 and 3 start up together, and by coincidence use the same slot (e.g., slot 3). By the time STs 2 and 3 register the collision, the slot used by ST1 has opened up, and ST2 (randomly) claims the now free slot from ST 1 when re-attempting to get into the persistent Aloha channel. Another information message is sent for frame N+3 to alert the STs that collision was detected on slot 3, and that no other slots are in use. That is, slot 5 is not available. In step 415, ST 2 selects to transmit on slot 5, while ST 3 selects slot 2. In step 417, an information message for frame N+4 is received by the STs, indicating that both slots 2 and 5 are occupied.

As evident from the above example, the persistent Aloha contention channels provides low-rate channels—at one slot per six frames or one slot per frame—that are contended for among the ST community in a carrier sense multiple access method (CSMA).

Figure 5:
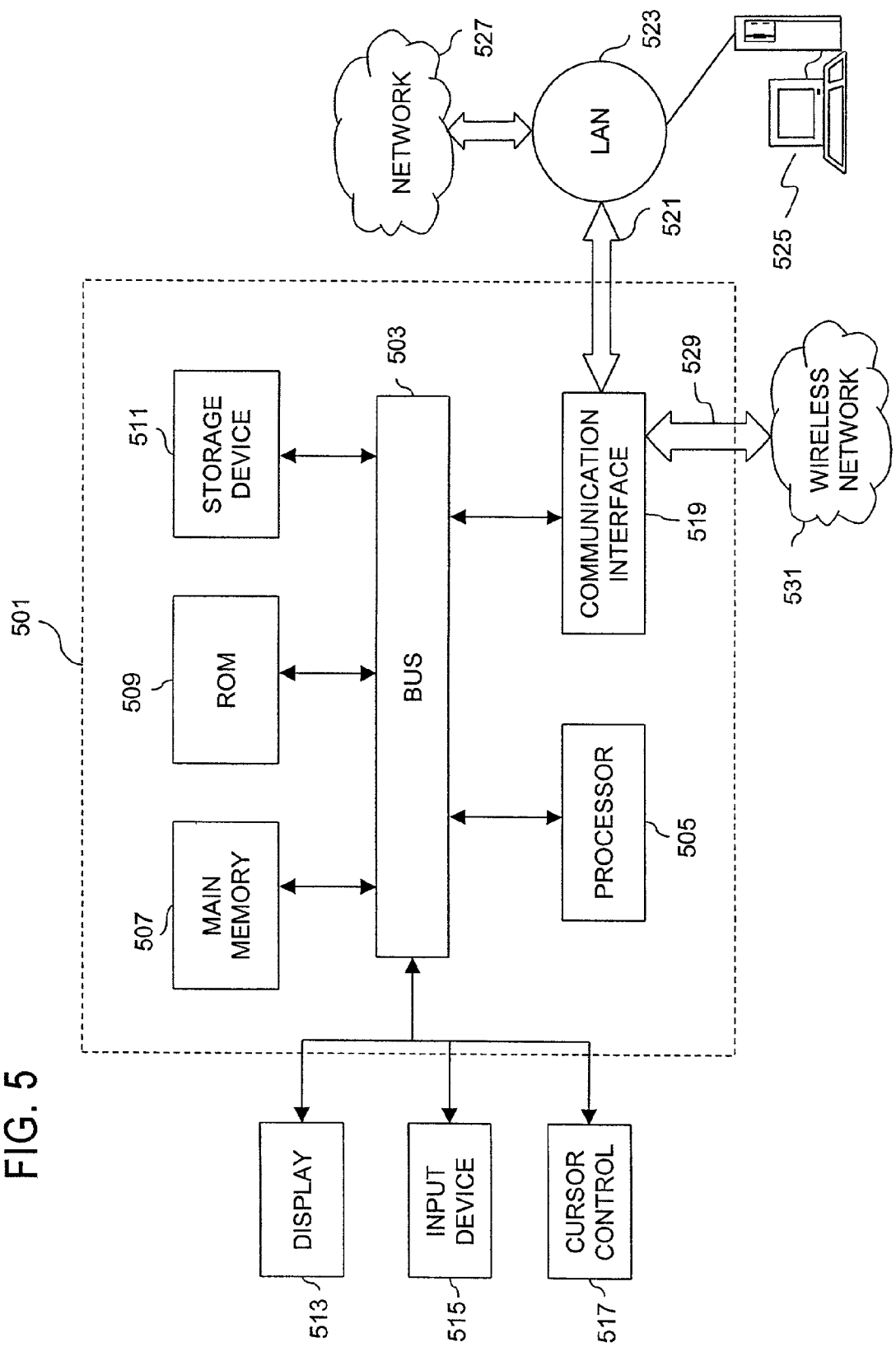
FIG. 5 is a diagram of a computer system that can execute the persistent Aloha protocol, in accordance with an embodiment of the present invention.

FIG. 5 illustrates a computer system 501 upon which an embodiment according to the present invention may be implemented to execute the persistent Aloha protocol. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

According to one embodiment, the persistent Aloha scheme can be performed by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the PA scheme, as discussed in FIG. 3, may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to the PA scheme remotely into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be a wireless transceiver, an asymmetrical digital subscriber line (ADSL) card, an integrated services digital network (ISDN) card or a modem to provide a data communication connection to a corresponding type of telephone line. Wireless links 529 may also be implemented to communicate with wireless network 531. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection though local network 523 to a host computer 525 or to data equipment operated by a service provider, which provides data communication services through a communication network 527 (e.g., the Internet). LAN 523 and network 527 both use electrical, electromagnetic or optical signals that carry digital data streams. Computer system 501 can transmit notifications and receive data, including program code, through the network(s), network link 521 and communication interface 519.

The techniques described herein provide several advantages over prior approaches to utilizing contention channels for transport of data traffic. The ST transmits a packet over a transmission slot of the channel using a contention protocol, such as persistent Aloha. The ST also reserves an available transmission slot, which is maintained until expiration of a predetermined timeout period. This arrangement advantageously provides capacity efficiency as well as low latency by starting with contention access.

Obviously, numerous modifications and variations of the present invention are possible in light of the above teachings. It is therefore to be understood that within the scope of the appended claims, the invention may be practiced otherwise than as specifically described herein.

What is claimed is:

1. A method for transmitting packets over a shared communication channel that is partitioned into a plurality of transmission slots, the method comprising:

determining a plurality of available transmission slots in a frame in a channel based on unused time slots in a previous frame;

transmitting one of the packets over one of the plurality of available transmission slots of the channel using a contention protocol;

reserving an available transmission slot based on a previously successful transmission of said one packet on the same transmission slot;

maintaining the reserved transmission slot until expiration of a predetermined timeout period; and relinquishing said reserved transmission slot based on the expiration of said predetermined timeout period;

wherein the communication channel is provided by a plurality of Time Division Multiple Access (TDMA) frames used in a satellite communication system; and wherein the contention protocol in the transmitting step is persistent Aloha; and the method further comprising:

designating one time slot per every sixth TDMA frame for contention transmission.

2. The method according to claim 1, further comprising:

receiving an information message associated with the transmission step indicating a valid transmission of the one packet, wherein the reserving step is performed based upon the received information message.

3. The method according to claim 1, wherein the contention protocol in the transmitting step is persistent Aloha, the method further comprising:

designating one time slot per TDMA frame for contention transmission.

4. The method according to claim 1, wherein the packets include at least one of Transmission Control Protocol (TCP) traffic and web browsing traffic.

5. The method according to claim 1, wherein the transmitting step comprises:

randomly selecting one transmission slot according to a uniform distribution.

6. A method for transmitting packets over a shared communication channel that is partitioned into a plurality of transmission slots, the method comprising:

determining a plurality of available transmission slots in a frame in a channel based on unused time slots in a previous frame;

transmitting one of the packets over one of the plurality of available transmission slots of the channel using a contention protocol;

reserving an available transmission slot based on a previously successful transmission of said one packet on the same transmission slot;

maintaining the reserved transmission slot until expiration of a predetermined timeout period; and relinquishing said reserved transmission slot based on the expiration of said predetermined timeout period; and wherein the maintaining step comprises:

transmitting null packets into the reserved transmission slot.

7. A terminal apparatus for transmitting packets over a shared communication channel that is partitioned into a plurality of transmission slots, comprising:

a plurality of queues configured to store the packets; and a processor configured to determine a plurality of available transmission slots in a frame in a channel based on unused transmission slots in a previous frame, then transmit one of the packets over one of the plurality of available transmission slots of the channel using a contention protocol, the processor reserving said available transmission slot based on a previously successful transmission of the said one packet on the same transmission slot, wherein the reserved transmission slot is maintained until expiration of a predetermined timeout period and then relinquished based on the expiration of said predetermined timeout period;

wherein the communication channel is provided by a plurality of Time Division Multiple Access (TDMA) frames used in a satellite communication system; and wherein the contention protocol is persistent Aloha and one time slot per every sixth TDMA frame is provided for contention transmission.

8. The apparatus according to claim 7, wherein the processor receives an information message associated with the transmitted one packet indicating a valid transmission of the one packet, wherein the reserved transmission slot is reserved based upon the information message.

9. The apparatus according to claim 7, wherein the contention protocol is persistent Aloha and one time slot per TDMA frame is provided for contention transmission.

10. The apparatus according to claim 7, wherein the packets include at least one of Transmission Control Protocol (TCP) traffic and web browsing traffic.

11. The apparatus according to claim 7, wherein the processor randomly selects the one transmission slot according to a uniform distribution.

12. A terminal apparatus for transmitting packets over a shared communication channel that is partitioned into a plurality of transmission slots, comprising:

a plurality of queues configured to store the packets; and a processor configured to determine a plurality of available transmission slots in a frame in a channel based on unused transmission slots in a previous frame, then transmit one of the packets over one of the plurality of available transmission slots of the channel using a contention protocol, the processor reserving said available transmission slot based on a previously successful transmission of the said one packet of the same transmission slot, wherein the reserved transmission slot is maintained until expiration of a predetermined timeout period and then relinquished based on the expiration of said predetermined timeout period;

wherein the processor is configured to instruct transmission of null packets into the reserved transmission slot to maintain the reservation.

13. A satellite communication system comprising:

a payload configured to forward packets; and a plurality of terminals configured to transmit the packets over a shared communication channel that is partitioned into a plurality of transmission slots, each of the terminals comprising:

a plurality of queues configured to store the packets; and a processor configured to receive at least one information message associated with a channel and determine a plurality of available transmission slots in a frame in said channel based on unused transmission slots in a previous frame, then transmit one of the packets over one of the plurality of available transmission slots of the channel using a contention protocol, the processor reserving said available transmission slot based on a previously successful transmission of said one packet on the same transmission slot, wherein the reserved transmission slot is maintained until expiration of a predetermined timeout period, and then relinquished based on the expiration of said predetermined timeout period;

wherein the communication channel is provided by a plurality of Time Division Multiple Access (TDMA) frames; and wherein the contention protocol is persistent Aloha and one time slot per every sixth TDMA frame is provided for contention transmission.

14. The system according to claim 13, wherein the processor receives an information message associated with the transmitted packet indicating a valid transmission of the one packet, wherein the reserved transmission slot is reserved based upon the information message.

15. The system according to claim 13, wherein the contention protocol is persistent Aloha and one time slot per TDMA frame is provided for contention transmission.

16. The system according to claim 13, wherein the packets include at least one of Transmission Control Protocol (TCP) traffic and web browsing traffic.

17. The system according to claim 13, wherein the processor randomly selects one transmission slot according to a uniform distribution.

18. A satellite communications system, comprising:

a payload configured to forward packets; and a plurality of terminals configured to transmit the packets over a shared communication channel that is partitioned into a plurality of transmission slots, each of the terminals comprising:

a plurality of queues configured to store the packets, and a processor configured to receive at least one information message associated with a channel and determine a plurality of available transmission slots in a frame in said channel based on unused transmission slots in a previous frame, then transmit one of the packets over one of the plurality of available transmission slots of the channel using a contention protocol, the processor reserving said available transmission slot based on a previously successful transmission of said one packet on the same transmission slot, wherein the reserved transmission slot is maintained until expiration of a predetermined timeout period, and then relinquished based on the expiration of said predetermined timeout period;

wherein the processor is configured to instruct transmission of null packets into the reserved transmission slot to maintain the reservation.

19. A terminal apparatus for transmitting packets over a shared communication channel that is partitioned into a plurality of transmission slots, comprising:
   means for determining a plurality of available transmission slots in a frame in a channel based on unused transmission slots in a previous frame;
   means for transmitting one of the packets over one of the plurality of available transmission slots of the channel using a contention protocol;
   means for reserving an available transmission slot based on a previously successful transmission of said one packet on the same transmission slot;
   means for maintaining the reserved transmission slot until expiration of a predetermined timeout period; and
   means for relinquishing the reserved transmission slot based on the expiration of said predetermined timeout period;
   wherein the communication channel is provided by a plurality of Time Division Multiple Access (TDMA) frames used in a satellite communications system; and
   wherein the contention protocol is persistent Aloha; and the apparatus further comprising:
   means for designating one time slot per every sixth TDMA frame for contention transmission.

20. The apparatus according to claim 19, further comprising:
   means for receiving an information message associated with the plurality of transmission slots indicating a valid transmission of the one packet, wherein the reserved transmission slot is reserved based upon the information message.

21. The apparatus according to claim 19, wherein the contention protocol in the transmitting step is persistent Aloha, the apparatus further comprising:
   means for designating one time slot per TDMA frame for contention transmission.

22. The apparatus according to claim 19, wherein the packets include at least one of Transmission Control Protocol (TCP) traffic and web browsing traffic.

23. The apparatus to claim 19, further comprising:
   means for randomly selecting one transmission slot according to a uniform distribution.

24. A terminal apparatus for transmitting packets over a shared communication channel that is partitioned into a plurality of transmission slots, comprising:
   means for determining a plurality of available transmission slots in a frame in a channel based on unused transmission slots in a previous frame;
   means for transmitting one of the packets over one of the plurality of available transmission slots of the channel using a contention protocol;
   means for reserving said available transmission slot based on a previously successful transmission of said one packet on the same transmission slot;
   means for maintaining the reserved transmission slot until expiration of a predetermined timeout period; and
   means for relinquishing the reserved transmission slot based on the expiration of said predetermined timeout period;
   wherein them maintaining means transmits null packets into the reserved transmission slot.

25. A computer-readable medium encoded with one or more sequences of one or more instructions for transmitting packets over a shared communication channel that is partitioned into a plurality of transmission slots, the one or more sequences of one or more instructions including instruction which, when executed by one or more processors, cause the one or more processors to perform the steps of:
   determining a plurality of available transmission slots in a frame in a channel based on unused transmission slots in a previous frame;
   transmitting one of the packets over one of the plurality of available transmission slots of the channel using a contention protocol;
   reserving said available transmission slot based on a previously successful transmission of said one packet on the same transmission slot;
   maintaining the reserved transmission slot until expiration of a predetermined timeout period; and
   relinquishing the reserved transmission slot based on the expiration of said predetermined timeout period;
   wherein the communication channel is provided by a plurality of Time Division Multiple Access (TDMA) frames used in a satellite communications system; and
   wherein the contention protocol in the transmitting step is persistent Aloha, the one or more processors further performing the step of:
   designating one time slot per every sixth TDMA frame for contention transmission.

26. The computer-readable medium according to claim 25, wherein the one or more processors further perform the step of:
   receiving an information message associated with the transmitting step indicating a valid transmission of the one packet, wherein the reserving step is performed based upon the received information message.

27. The computer-readable medium according to claim 25, wherein the contention protocol in the transmitting step is persistent Aloha, the one or more processors further performing the step of:
   designating one time slot per TDMA frame for contention transmission.

28. The computer-readable medium according to claim 25, wherein the packets include at least one of Transmission Control Protocol (TCP) traffic and web browsing traffic.

29. The computer-readable medium according to claim 25, wherein the transmitting step comprises:
   randomly selecting one transmission slot according to a uniform distribution.

30. A computer-readable medium encoded with one or more sequences of one or more instructions for transmitting packets over a shared communication channel that is partitioned into a plurality of transmission slots, the one or more sequences of one or more instructions including instruction which, when executed by one or more processors, cause the one or more processors to perform the steps of:
   determining a plurality of available transmission slots in a frame in a channel based on unused transmission slots in a previous frame;
   transmitting one of the packets over one of the plurality of available transmission slots of the channel using a contention protocol;
   reserving said available transmission slot based on a previously successful transmission of said one packet on the same transmission slot;
   maintaining the reserved transmission slot until expiration of a predetermined timeout period; and
   relinquishing the reserved transmission slot based on the expiration of said predetermined timeout period; and
   wherein the maintaining step comprises:
   transmitting null packets into the reserved transmission slot.

* * * * *